US006962225B2

(12) United States Patent
Conte

(10) Patent No.: US 6,962,225 B2
(45) Date of Patent: Nov. 8, 2005

(54) PIPE SYSTEM FOR A MOTORCYCLE

(75) Inventor: Bruno Conte, Redondo Beach, CA (US)

(73) Assignee: Honda Motor Company, Ltd., Tokyo (JP)

( * ) Notice: Subject to any disclaimer, the term of this patent is extended or adjusted under 35 U.S.C. 154(b) by 16 days.

(21) Appl. No.: 10/819,785

(22) Filed: Apr. 7, 2004

(65) Prior Publication Data

US 2005/0224273 A1 Oct. 13, 2005

(51) Int. Cl.[7] .............................................. F02D 23/00
(52) U.S. Cl. ...................... 180/68.3; 180/219; 180/309
(58) Field of Search .............................. 180/68.3, 219, 180/309; 60/605.1

(56) References Cited

U.S. PATENT DOCUMENTS 4,427,087 A 1/1984 Inoue et al.
4,432,205 A 2/1984 Inoue et al.
4,436,172 A 3/1984 Inoue et al.
4,475,617 A * 10/1984 Minami et al. ............. 180/219
4,550,794 A 11/1985 Inoue et al.
4,593,656 A * 6/1986 Shibata et al. ......... 123/184.47
4,735,178 A 4/1988 Inoue et al.
5,016,725 A * 5/1991 Muramatsu ................. 180/225
5,050,701 A * 9/1991 Okui et al. ................. 180/297
5,199,522 A * 4/1993 Martenas et al. .......... 180/68.3
5,263,463 A 11/1993 Perry

* cited by examiner

*Primary Examiner*—Kevin Hurley
(74) *Attorney, Agent, or Firm*—Dinsmore & Shohl LLP

(57) ABSTRACT

A motorcycle includes a frame, a front wheel, a rear wheel, an engine and a plenum. The rotational axes of the front and rear wheels define a first plane that is perpendicular to a second plane. The engine includes an air intake port and an exhaust port. A first pipe transmits air from the plenum to the air intake port and has a first longitudinal section. A second pipe receives exhaust from the exhaust port and has a second longitudinal section. The first and second longitudinal sections have substantially identical cross sectional configurations and are located on opposite sides of the second plane such that they are, at corresponding longitudinal locations, substantially equally spaced from the second plane. Also, the first and second longitudinal sections are located such that they are, at corresponding longitudinal locations, substantially equally spaced with respect to the first plane.

21 Claims, 5 Drawing Sheets

PIPE SYSTEM FOR A MOTORCYCLE

TECHNICAL FIELD

The present invention relates to a pipe system for a motorcycle. More particularly, a pipe system involves an air intake pipe and an exhaust pipe that each include longitudinal sections that mirror one another upon opposite sides of the motorcycle.

BACKGROUND OF THE INVENTION

When a conventional motorcycle includes only a single exhaust pipe, that pipe is typically associated with either the left or right side of the motorcycle. For example, when such a motorcycle includes a single exhaust pipe on its right side, no exhaust pipe is provided upon its left side. As an exhaust pipe provides a prominent aesthetic characteristic of a motorcycle, onlookers of the motorcycle having only one exhaust pipe might observe that the motorcycle undesirably exhibits an asymmetrical, lopsided or otherwise unbalanced appearance. Adding an exhaust pipe to the left side of the motorcycle can be inefficient, cost prohibitive and can sufficiently increase the motorcycle's weight as to reduce the motorcycle's performance characteristics. Accordingly, there is a need for a pipe system for a motorcycle that includes only a single exhaust pipe but that nevertheless appears balanced upon the motorcycle.

SUMMARY OF THE INVENTION

It is an aspect of the present invention to provide a pipe system for a motorcycle that includes only a single exhaust pipe but that nevertheless appears balanced upon the motorcycle. In accordance with one exemplary embodiment of the present invention, a motorcycle comprises a frame having a front end and a rear end. The frame extends longitudinally from the front end to the rear end. A front wheel is secured to the front end of the frame and is rotatable about a first axis. A rear wheel is secured to the rear end of the frame and is rotatable about a second axis. The first and second axes define a first plane, wherein the first plane is perpendicular to a second plane. An engine is supported by the frame and is located substantially between the front and rear ends of the frame. The engine includes at least one air intake port and at least one exhaust port. A plenum is supported relative to the frame and is operative to receive ambient air for consumption by the engine. A first pipe transmits air from the plenum to the air intake port of the engine. The first pipe has a first longitudinal section. A second pipe receives exhaust from the exhaust port of the engine. The second pipe has a second longitudinal section. The first and second longitudinal sections have substantially identical cross sectional configurations. The first and second longitudinal sections are located on opposite sides of the second plane such that the first and second longitudinal sections are, at corresponding longitudinal locations, substantially equally spaced from the second plane. The first and second longitudinal sections are located such that the first and second longitudinal sections are, at corresponding longitudinal locations, substantially equally spaced with respect to the first plane.

In accordance with another exemplary embodiment of the present invention, a motorcycle comprises a frame having a front end and a rear end. The frame extends longitudinally from the front end to the rear end. A front wheel is secured to the front end of the frame and is rotatable about a first axis. A rear wheel is secured to the rear end of the frame and is rotatable about a second axis. The first and second axes define a first plane, wherein the first plane is perpendicular to a second plane. An engine is supported by the frame and is located substantially between the front and rear ends of the frame. The engine includes at least one air intake port and at least one exhaust port. A plenum is supported relative to the frame adjacent to the rear end and is operative to receive ambient air for consumption by the engine. A turbocharger is supported relative to the frame adjacent to the front end. The turbocharger has an intake chamber and an exhaust chamber. The intake chamber comprises an intake input port and an intake output port. The exhaust chamber comprises an exhaust input port and an exhaust output port. At least one muffler is supported relative to the frame adjacent to the rear end. A first pipe has a first longitudinal section and is coupled with both the plenum and with the intake input port of the turbocharger. A second pipe has a second longitudinal section and is coupled with both the exhaust output port of the turbocharger and with said muffler. The first and second longitudinal sections have substantially identical cross sectional configurations. The first and second longitudinal sections are located on opposite sides of the second plane such that the first and second longitudinal sections are, at corresponding longitudinal locations, substantially equally spaced from the second plane. The first and second longitudinal sections are located such that the first and second longitudinal sections are, at corresponding longitudinal locations, substantially equally spaced with respect to the first plane. A third pipe is coupled with both the intake output port of the turbocharger and with the air intake port of the engine. A fourth pipe is coupled with both the exhaust input port of the turbocharger and with the exhaust port of the engine.

In accordance with yet another exemplary embodiment of the present invention, a motorcycle comprises a frame having a front end and a rear end. The frame extends longitudinally from the front end to the rear end. A front wheel is secured to the front end of the frame and is rotatable about a first axis. A rear wheel is secured to the rear end of the frame and is rotatable about a second axis. The first and second axes define a first plane, wherein the first plane is perpendicular to a second plane. An engine is supported by the frame and is located substantially between the front and rear ends of the frame. The engine includes at least one air intake port and at least one exhaust port. A plenum is supported relative to the frame adjacent to the front end and is operative to receive ambient air for consumption by the engine. At least one muffler is supported relative to the frame adjacent to the rear end. A first pipe has a first longitudinal section and is coupled with both the plenum and with the air intake port of the engine. A second pipe has a second longitudinal section and is coupled with both the exhaust port of the engine and with said muffler. The first and second longitudinal sections have substantially identical cross sectional configurations. The first and second longitudinal sections are located on opposite sides of the second plane such that the first and second longitudinal sections are, at corresponding longitudinal locations, substantially equally spaced from the second plane. The first and second longitudinal sections are located such that the first and second longitudinal sections are, at corresponding longitudinal locations, substantially equally spaced with respect to the first plane.

One advantage of the present invention is its provision of a pipe system for a motorcycle that includes only a single exhaust pipe but that nevertheless appears balanced upon the motorcycle. Additional aspects, advantages and novel features of the invention will be set forth in part in the description that follows, and in part will become apparent to those skilled in the art upon examination of the following or may be learned with the practice of the invention. The aspects and advantages of the invention may be realized and attained by means of the instrumentalities and combinations particularly pointed out in the appended claims.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION OF EXEMPLARY EMBODIMENTS

Figure 1:
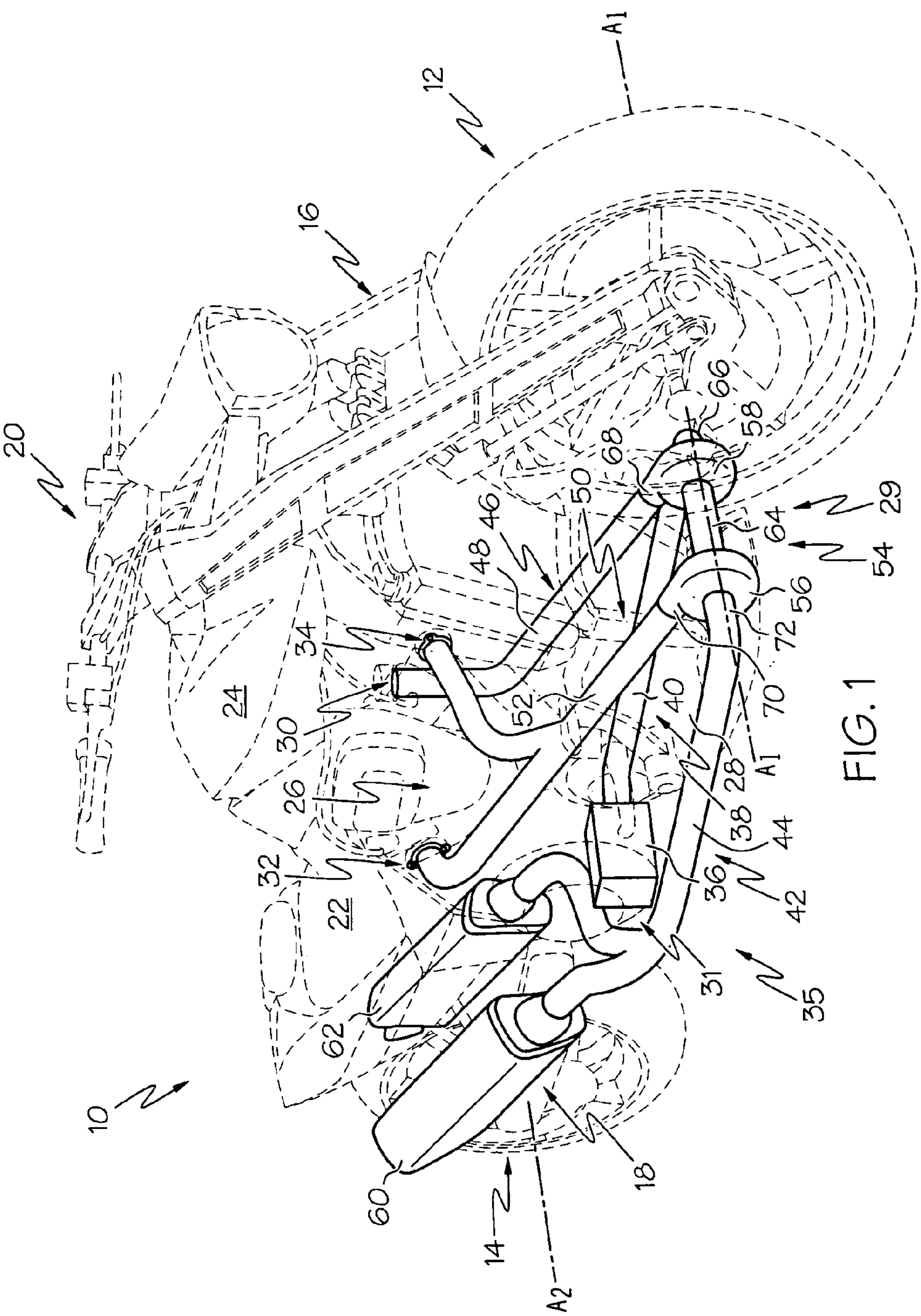
FIG. 1 is a front prospective view of a motorcycle having a pipe system in accordance with one exemplary embodiment of the present invention, wherein for clarity of depiction, the pipe system is shown in solid lines and the motorcycle is shown in dashed lines.

The present invention and its operation are hereinafter described in detail in connection with the views and examples of FIGS. 1–5, wherein like numbers indicate the same or corresponding elements throughout the views. As shown in FIG. 1, a pipe system 35 in accordance with one exemplary embodiment of the present invention is associated with a motorcycle 10. The motorcycle 10 is shown to comprise a frame 28 having a front end 29 and a rear end 31. An engine 26 is shown to be supported by the frame 28 and is located substantially between the front end 29 and the rear end 31 of the frame 28. A front wheel 12 is shown to be secured to the front end 29 of the frame 28 with a front fork 16. A rear wheel 14 is shown to be secured to the rear end 31 of the frame 28 with a rear fork 18. Handlebars 20 are shown as being provided in connection with the front fork 16 to facilitate steering of the motorcycle 10 by an operator seated upon a seat 22. A fuel tank 24 is shown as being associated with the frame 28 in a location above the engine 26.

The engine 26 is shown to include an air intake port 30 and two exhaust ports 32 and 34. It should be appreciated, however, that the engine 26 is merely exemplary and that a pipe system in accordance with the present invention could alternatively be associated with engines having more than one air intake port and/or virtually any number of exhaust ports.

An air plenum 36 can be provided to receive ambient air for consumption by the engine. As shown in FIG. 1, the air plenum 36 can comprise a box or some other housing to encompass an air filter for cleaning the air and/or for substantially preventing airborne particles from entering the engine 26. Although the air plenum 36 can be associated with the frame 28 in any of a variety of specific locations, the air plenum 36 is shown in FIG. 1 to be disposed adjacent to the rear end 31 of the frame 28, and in a position behind the engine 26 and near the rear wheel 14.

The motorcycle 10 is shown in FIG. 1 to include a turbocharger 54 that is supported relative to the frame 28 adjacent to the front end 29 of the frame 28. In alternate embodiments, the turbocharger can be associated with the frame 28 in any of a variety of other specific locations (e.g., near rear end 31). The turbocharger 54 includes an intake chamber 58 and an exhaust chamber 56. The intake chamber 58 comprises an intake input port 66 and an intake output port 68, and the exhaust chamber 56 comprises an exhaust input port 70 and an exhaust output port 72. A first pipe 38 is shown as being coupled with both the air plenum 36 and with the intake input port 66 of the turbocharger 54. A third pipe 46 is shown as being coupled with both the intake output port 68 of the turbocharger 54 and with the air intake port 30 of the engine 26. Ambient air received by the air plenum 36 passes through the first pipe 38 into the intake chamber 58 of the turbocharger 54, and the air is then passed from the intake chamber 58 of the turbocharger 54 to the air intake port 30 of the engine 26 through the third pipe 46.

One or more pipes can also be provided to transmit exhaust gases from the exhaust ports 32 and 34 of the engine 26 to one or more mufflers (e.g., 60, 62). The mufflers 60, 62 are shown in FIG. 1 to be supported relative to the frame 28 adjacent to the rear end 31 of the frame 28. In the embodiment depicted in FIG. 1, a fourth pipe 50 is shown as being coupled with both exhaust ports 32, 34 of the engine 26 and with the exhaust input port 70 of the exhaust chamber 56 of the turbocharger 54. A second pipe 42 is then coupled with both the exhaust output port 72 of the turbocharger 54 and with one or more mufflers (e.g., 60, 62). Exhaust gases emitted from the exhaust ports 32 and 34 of the engine 26 pass through the fourth pipe 50 into the exhaust chamber 56 of the turbocharger 54, and the exhaust gases are then passed from the exhaust chamber 56 of the turbocharger 54 to the mufflers (e.g., 60, 62) through the second pipe 42.

The exhaust chamber 56 includes an impeller and the intake chamber 58 includes a blower. This impeller and blower are operably coupled with one another (e.g., with a common shaft passing through connector 64). In this manner, as exhaust passes through the exhaust chamber 56 of the turbocharger 54, the impeller is caused to rotate. Due to the aforementioned coupling between the impeller and the blower, the rotation of the impeller causes the blower within the intake chamber 58 to correspondingly rotate. Hence, when the impeller is caused to rotate by passing exhaust gases, the operably coupled blower also correspondingly rotates. This rotation of the impeller causes an increase in air flow to the air intake port 30 of the engine 26. The turbocharger 54 thereby effectively uses the pressurization of exhaust to increase the pressurization of intake air, which accordingly improves the performance of the engine 26 under certain circumstances.

Figure 4:
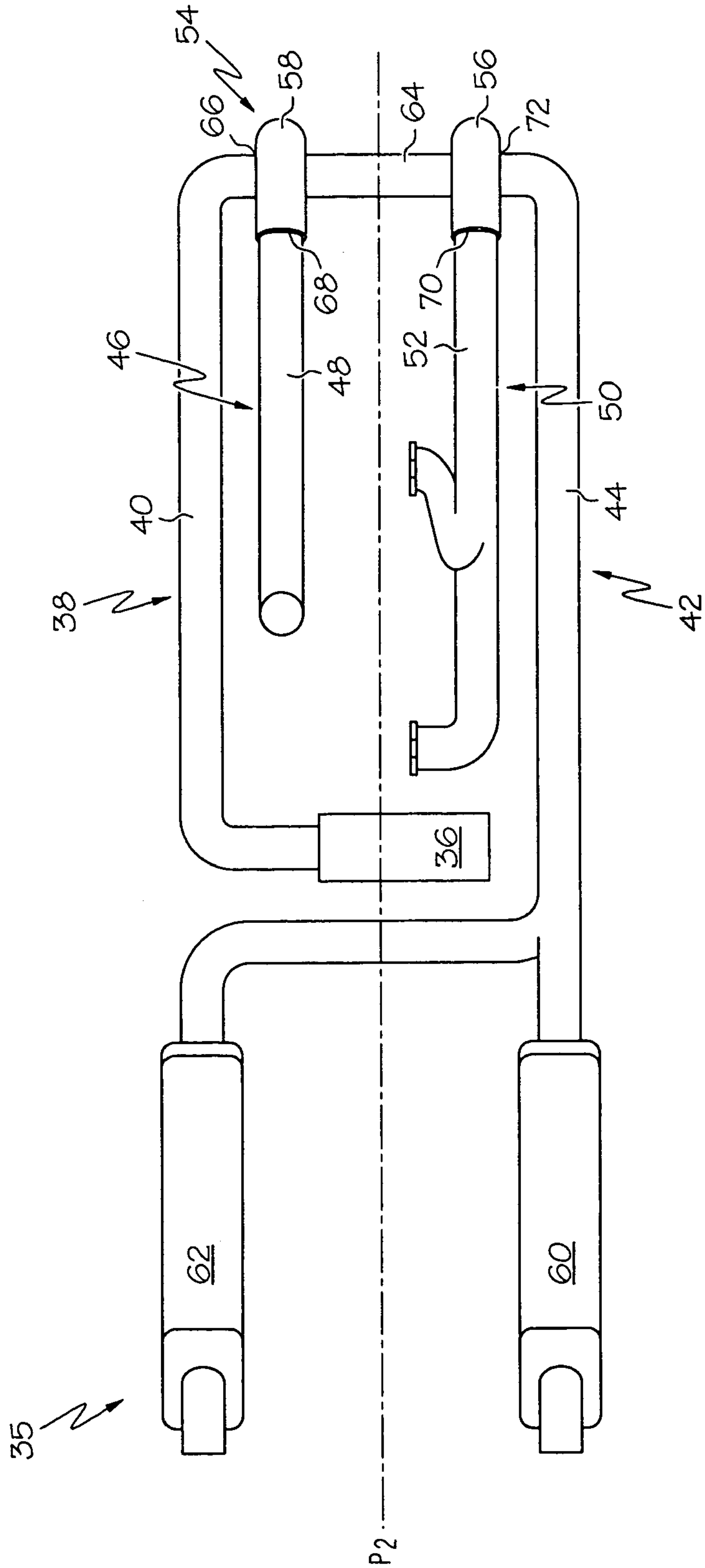
FIG. 4 is a top plane view of the pipe system of FIGS. 1–3, but with the remainder of the motorcycle being omitted for clarity.

The first pipe 38 is shown in FIGS. 1 and 4 to include a first longitudinal section 40 and the second pipe 42 is shown to include a second longitudinal section 44. The first and second longitudinal sections 40 and 44 are shown to have substantially identical cross-sectional configurations. More particularly, the first and second longitudinal sections 40 and 44 are both shown to be generally round pipes having similar diametrical dimensions. In some embodiments, the second longitudinal section 44 might be substantially parallel with the first longitudinal section 40.

As further shown in FIG. 1, the first and second longitudinal sections 40, 44 can both extend substantially from the front end 29 of the frame 28 to the rear end 31 of the frame 28. This substantial extension can, in one embodiment, involve the first and second longitudinal sections 40, 44 extending at least one third of the distance between the front end 29 of the frame 28 and the rear end 31 of the frame 28. In another embodiment, this substantial extension can involve the first and second longitudinal sections 40, 44 extending at least half of the distance between the front end 29 of the frame 28 and the rear end 31 of the frame 28. In still another embodiment, this substantial extension can involve the first and second longitudinal sections 40, 44 extending at least two thirds of the distance between the front end 29 of the frame 28 and the rear end 31 of the frame 28. In yet another embodiment, this substantial extension can involve the first and second longitudinal sections 40, 44 extending at least three quarters of the distance between the front end 29 of the frame 28 and the rear end 31 of the frame 28. In another embodiment, the first and second longitudinal sections 40, 44 can extend the entire distance between the front end 29 of the frame 28 and the rear end 31 of the frame 28.

Figure 2:
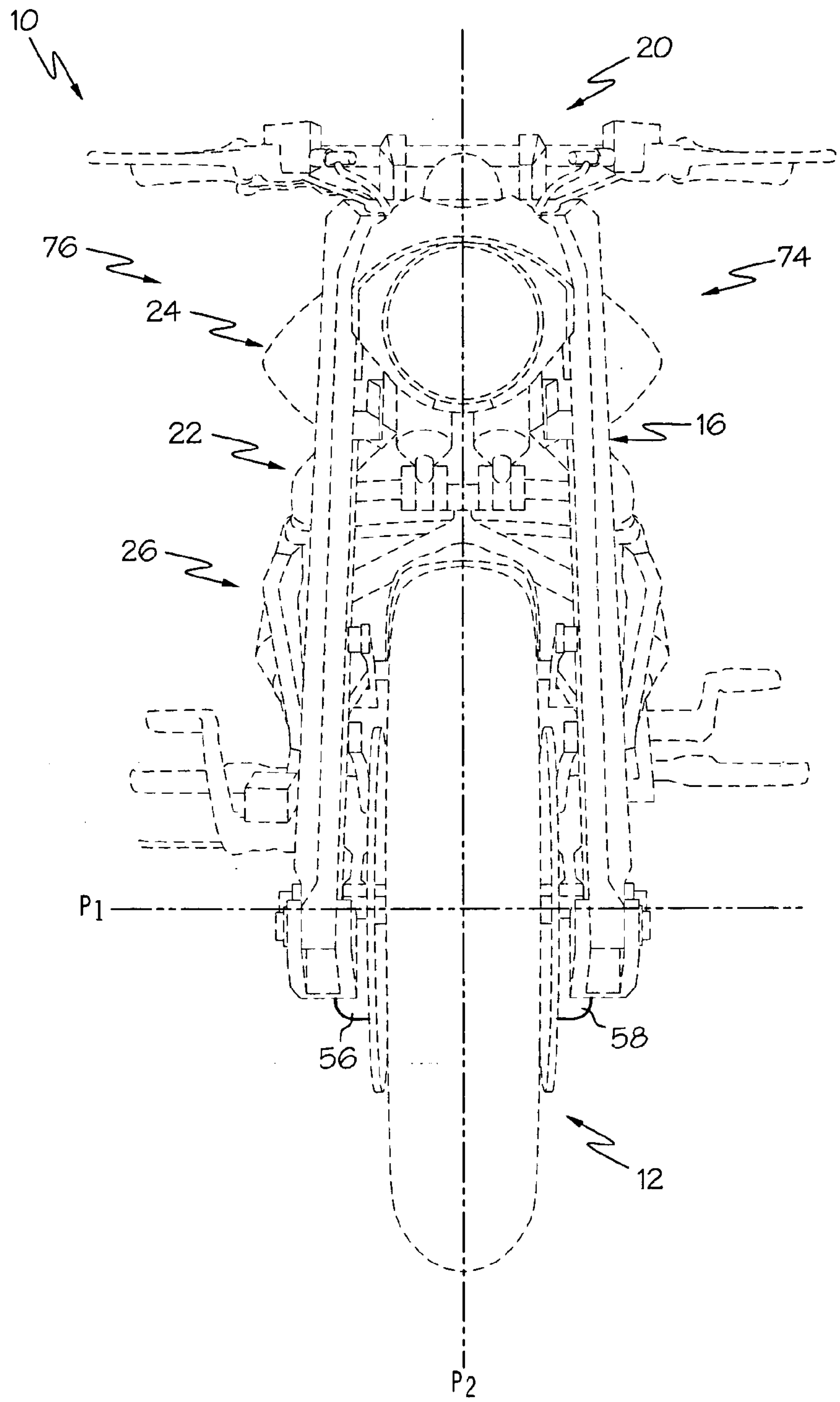
FIG. 2 is a front elevational view depicting the motorcycle of FIG. 1.

Regardless of the particular length of travel from the front end 29 to the rear end 31 of the frame 28, the first and second longitudinal sections 40, 44 can extend along a substantially corresponding portion of this longitudinal distance such that the first and second longitudinal sections 40, 44 comprise substantial mirror images of one another on each side of the motorcycle 10. To further enhance this mirror image likeness of the first and second longitudinal sections 40, 44, the first and second longitudinal sections 40, 44 can be located similarly with respect to certain planes that intersect the motorcycle 10. More particularly, as shown in FIG. 2, a first plane $P_1$ is shown to intersect the motorcycle 10 horizontally, and is defined by the rotational axis $A_1$ of the front wheel 12 and by the rotational axis $A_2$ of the rear wheel 14, both of which rotational axes $A_1$ and $A_2$ are shown in FIG. 1. A second plane $P_2$ intersects plane $P_1$ perpendicularly and is shown in FIG. 2 to intersect the motorcycle 10 substantially vertically. The second plane $P_2$ may vertically intersect the front wheel 12 and/or rear wheel 14, but in any event can generally bisect the motorcycle 10 and/or its frame 28 (e.g., in half).

Figure 3:
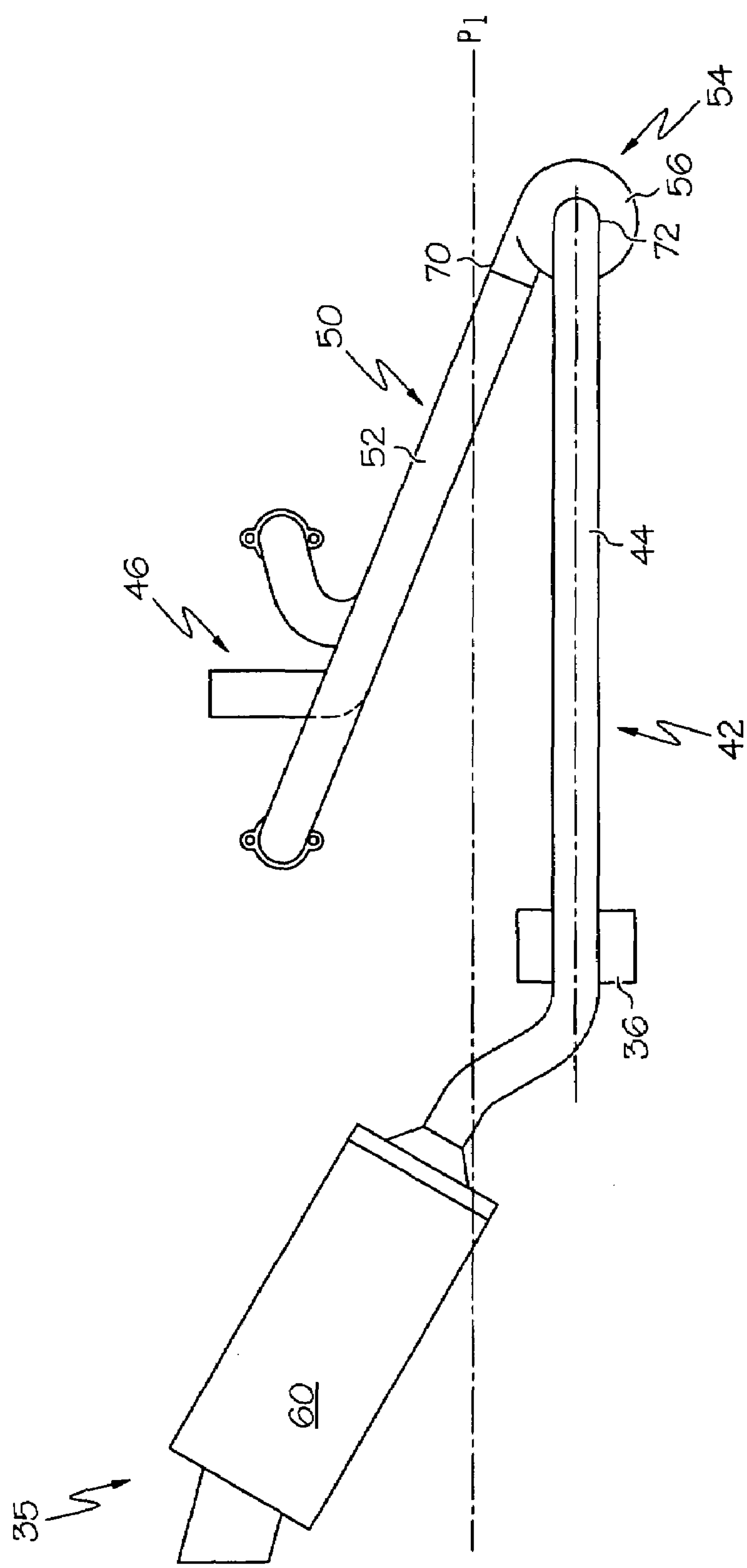
FIG. 3 is a side elevational view depicting the exemplary pipe system of FIGS. 1–2, but with the remainder of the motorcycle being omitted for clarity.

The first and second pipes can be substantially equally spaced with respect to the first plane $P_1$. For example, as shown in FIG. 3, the second longitudinal section 44 and the first longitudinal section (hidden behind the second longitudinal section 44) are both located such that corresponding longitudinal locations of the first and second longitudinal sections are substantially equally spaced with respect to the first plane $P_1$. For example, the motorcycle 10 of FIG. 1 is shown to have a front wheel 12 and a rear wheel 14 that both have similar diameters. As such, the first plane $P_1$ for such a motorcycle 10 is generally parallel to the ground during normal operation of the motorcycle 10. In such an embodiment, corresponding longitudinal locations of the first and second longitudinal sections 40, 44 are substantially equally spaced from the ground.

Although FIGS. 1 and 3 depict each longitudinal location of both the first and second longitudinal sections 40, 44 as being substantially equally spaced with respect to the first plane $P_1$, it should be appreciated that particular corresponding longitudinal locations of the first and second longitudinal sections 40, 44 can in some embodiments be spaced differently from the first plane $P_1$ than other particular corresponding longitudinal locations of the first and second longitudinal sections 40, 44. Accordingly, upwardly or downwardly directed bulges or bends might be disposed at corresponding longitudinal locations of both the first and second longitudinal sections, provided that the bulges or bends are equidistant from the first plane $P_1$ at each corresponding longitudinal location along the first and second longitudinal sections.

Also, the second longitudinal section 44 can substantially mirror the first longitudinal section 40 with respect to the second plane $P_2$. More particularly, corresponding longitudinal locations of each of the first and second longitudinal sections 40, 44 can be substantially equally spaced from the second plane $P_2$, as best shown in FIG. 4. However, the first longitudinal section 40 is disposed on an opposite side of the second plane $P_2$ than is the second longitudinal section 44. Hence, a motorcycle can have a left side and a right side, and one of the first and second longitudinal sections can be associated with the left side, and the other of the first and second longitudinal sections can be associated with the right side. More particularly, in the example of FIGS. 2 and 4, the first longitudinal section 40 is shown to be associated with the left side 74 of the motorcycle 10, and the second longitudinal section 44 is shown to be associated with the right side 76 of motorcycle 10.

Although FIGS. 1 and 4 depict each longitudinal location of both the first and second longitudinal sections 40, 44 as being substantially equally spaced from the second plane $P_2$, it should be appreciated that particular corresponding longitudinal locations of the first and second longitudinal sections 40, 44 can in some embodiments be spaced differently from the second plane $P_2$ than other particular corresponding longitudinal locations of the first and second longitudinal sections 40, 44. Accordingly, the outwardly or inwardly directed bulges or bends might be disposed at corresponding longitudinal locations of both the first and second longitudinal sections, provided that the bulges or bends are equidistant from the second plane $P_2$ at each corresponding longitudinal location of the first and second longitudinal sections.

It should also be appreciated from FIGS. 1–4 that the third pipe 46 can have a third longitudinal section 48 and that the fourth pipe 50 can have a fourth longitudinal section 52. These third and fourth longitudinal sections 48, 52 might be located upon opposite sides of the second plane $P_2$ such that they are, at corresponding longitudinal locations, substantially equally spaced from the second plane $P_2$. Also, these third and fourth longitudinal sections 48, 52 can be located such that they are, at corresponding longitudinal locations, substantially equally spaced with respect to the first plane $P_1$. It should accordingly be appreciated that the above discussion with respect to the orientation of the first and second longitudinal sections 40, 44 is equally applicable to the third and fourth longitudinal sections 48, 52. Furthermore, it should be appreciated that an exemplary motorcycle in accordance with the teachings of the present invention might only include one set of mirrored longitudinal sections (e.g., 40, 44, or 48, 52), or might alternatively include two or more sets of mirrored longitudinal sections (e.g., 40, 44, and 48, 52).

Figure 5:
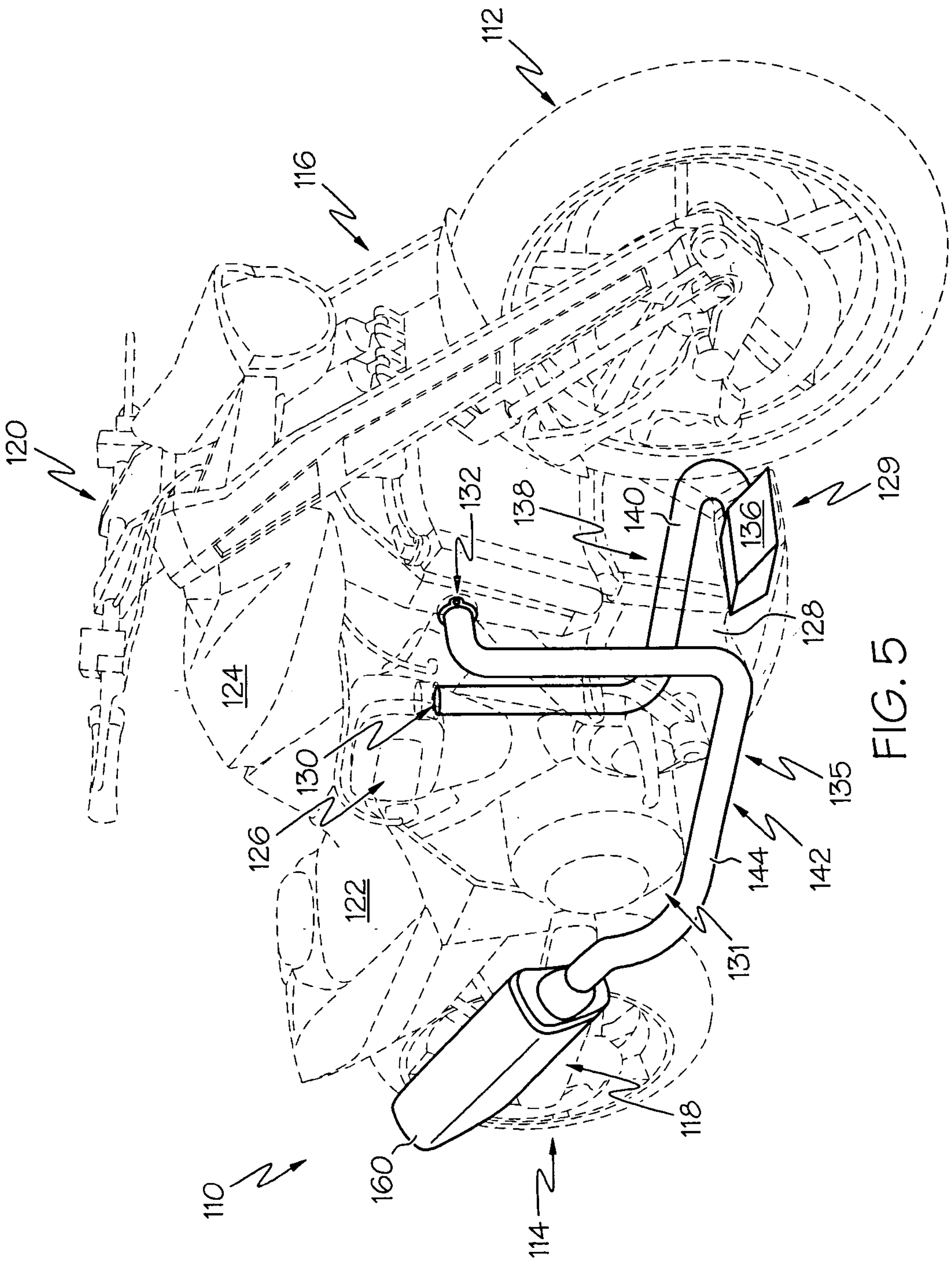
FIG. 5 is a front prospective view of a motorcycle having a pipe system in accordance with another exemplary embodiment of the present invention, wherein for clarity of depiction, the pipe system is shown in solid lines and the motorcycle is shown in dashed lines.

FIG. 5 depicts an alternate embodiment of a motorcycle 110 having a pipe system 135 in accordance with the teachings of the present invention. The motorcycle 110 includes a frame 128 having a front end 129 and a rear end 131. A front wheel 112 is shown as being secured to the front end 129 of the frame 128 with a front fork 116. The rear wheel 114 is shown as being secured to the rear end 131 of the frame 128 with a rear fork 118. Handlebars 120 are provided in connection with the front fork 116 to facilitate steering of the motorcycle 110 by an operator. An engine 126 is associated with the frame 128 and is disposed substantially between the front end 129 and the rear end 131 of the frame 128. A seat 122 is provided in association with the frame 128 to facilitate a resting place for an operator of the motorcycle 110. A fuel tank 124 is also associated with the frame 128 and is provided at a location above the engine 126.

The engine 126 can be provided with an air intake port 130 and an exhaust port 132. An air plenum 136 is shown as being provided in association with the frame (e.g., adjacent to the front end 129) for receiving ambient air for consumption by the engine 126. The exemplary pipe system 135 is shown to include a first pipe 138 that is coupled with both the air plenum 136 and with the air intake port 130 of the engine 126. The pipe system 135 also includes a second pipe 142 that is coupled with both the exhaust port 132 of the engine 126 and a muffler 160.

The first pipe 138 is shown to include a first longitudinal section 140 and the second pipe 142 is shown to include a second longitudinal section 144. The first and second longitudinal sections 140, 144 can both extend substantially or entirely from the front end 129 of the frame 128 to the rear end 131 of the frame 128, as described above with respect to the first and second longitudinal sections 40, 44 of the motorcycle 10 of FIGS. 1–4. Regardless of the particular length of travel from the front end 129 to the rear end 131 of the frame 128, the first and second longitudinal sections 140, 144 can extend along a substantially corresponding portion of this longitudinal distance such that the first and second longitudinal sections 140, 144 comprise substantial mirror images of one another on each side of the motorcycle 10, as discussed above with respect to the first and second longitudinal sections 40, 44 of the motorcycle 10 of FIGS. 1–4. For example, the first and second longitudinal sections 140, 144 can have substantially identical cross sectional configurations and can be located on opposite sides of a second (e.g., vertical) plane such that they are, at corresponding longitudinal locations, substantially equally spaced from the second plane. Also, the first and second longitudinal sections 140, 144 can be located such that they are, at corresponding longitudinal locations, substantially equally spaced with respect to a first (e.g., horizontal) plane.

The foregoing description of exemplary embodiments and examples of the invention has been presented for purposes of illustration and description. These examples and descriptions are not intended to be exhaustive or to limit the invention to the forms described. Numerous modifications are possible in light of the above teachings. Some of those modifications have been discussed, and others will be understood by those skilled in the art. It is hereby intended that the scope of the invention be defined by the claims appended hereto.

What is claimed is:

1. A motorcycle, comprising:

a frame having a front end and a rear end, the frame extending longitudinally from the front end to the rear end;

a front wheel secured to the front end of the frame, the front wheel being rotatable about a first axis;

a rear wheel secured to the rear end of the frame, the rear wheel being rotatable about a second axis, the first and second axes defining a first plane, the first plane being perpendicular to a second plane;

an engine supported by the frame, the engine being located substantially between the front and rear ends of the frame, the engine including at least one air intake port and at least one exhaust port;

a plenum being supported relative to the frame, the plenum being operative to receive ambient air for consumption by the engine;

a first pipe for transmitting air from the plenum to the air intake port of the engine, the first pipe having a first longitudinal section; and a second pipe for receiving exhaust from the exhaust port of the engine, the second pipe having a second longitudinal section, the first and second longitudinal sections having substantially identical cross sectional configurations, the first and second longitudinal sections being located on opposite sides of the second plane such that the first and second longitudinal sections are, at corresponding longitudinal locations, substantially equally spaced from the second plane, the first and second longitudinal sections being located such that the first and second longitudinal sections are, at corresponding longitudinal locations, substantially equally spaced with respect to the first plane.

2. The motorcycle of claim 1 having a left side and a right side, one of the first and second longitudinal sections being associated with the left side, and the other of the first and second longitudinal sections being associated with the right side.

3. The motorcycle of claim 1 wherein the second longitudinal section is substantially parallel with the first longitudinal section.

4. The motorcycle of claim 1 wherein the second longitudinal section substantially mirrors the first longitudinal section with respect to the second plane.

5. The motorcycle of claim 1 further comprising a turbocharger being supported relative to the frame, the turbocharger having an intake chamber and an exhaust chamber, wherein the intake chamber comprises an intake input port and an intake output port, and the exhaust chamber comprises an exhaust input port and an exhaust output port.

6. The motorcycle of claim 5 wherein the plenum is disposed adjacent to the rear end of the frame and the turbocharger is disposed adjacent to the front end of the frame, the first pipe being coupled with both the plenum and with the intake input port of the turbocharger, the second pipe being coupled with the exhaust output port of the turbocharger.

7. The motorcycle of claim 6 further comprising at least one muffler being supported relative to the frame adjacent to the rear end, the second pipe being further coupled with said muffler.

8. The motorcycle of claim 6 further comprising third and fourth pipes, the third pipe being coupled with both the intake output port of the turbocharger and with the air intake port of the engine, and the fourth pipe being coupled with both the exhaust input port of the turbocharger and with the exhaust port of the engine.

9. The motorcycle of claim 8 wherein the third pipe has a third longitudinal section and the fourth pipe has a fourth longitudinal section, the third and fourth longitudinal sections having substantially identical cross sectional configurations, the third and fourth longitudinal sections being located on opposite sides of the second plane such that the third and fourth longitudinal sections are, at corresponding longitudinal locations, substantially equally spaced from the second plane, the third and fourth longitudinal sections being located such that the third and fourth longitudinal sections are, at corresponding longitudinal locations, substantially equally spaced with respect to the first plane.

10. The motorcycle of claim 5 wherein the plenum is disposed adjacent to the rear end of the frame and the turbocharger is disposed adjacent to the front end of the frame, the first pipe being coupled with both the intake output port of the turbocharger and with the air intake port of the engine, and the second pipe being coupled with both the exhaust input port of the turbocharger and with the exhaust port of the engine.

11. The motorcycle of claim 10 further comprising third and fourth pipes, the third pipe being coupled with both the plenum and with the intake input port of the turbocharger, and the fourth pipe being coupled with the exhaust output port of the turbocharger.

12. The motorcycle of claim 11 further comprising at least one muffler being supported relative to the frame adjacent to the rear end, the fourth pipe being further coupled with said muffler.

13. The motorcycle of claim 11, wherein the third pipe comprises a third longitudinal section and the fourth pipe comprises a fourth longitudinal section, the third and fourth longitudinal sections having substantially identical cross sectional configurations, the third and fourth longitudinal sections being located on opposite sides of the second plane such that the third and fourth longitudinal sections are, at corresponding longitudinal locations, substantially equally spaced from the second plane, the third and fourth longitudinal sections being located such that the third and fourth longitudinal sections are, at corresponding longitudinal locations, substantially equally spaced with respect to the first plane.

14. The motorcycle of claim 1 wherein the first pipe is coupled with both the plenum and with the air intake port of the engine, and the second pipe is coupled with the exhaust port of the engine.

15. The motorcycle of claim 14 wherein the plenum is disposed adjacent to the front end of the frame.

16. The motorcycle of claim 15 further comprising at least one muffler being supported relative to the frame adjacent to the rear end, the second pipe being further coupled with said muffler.

17. The motorcycle of claim 1 wherein the second plane vertically intersects the frame.

18. The motorcycle of claim 1 wherein the first and second longitudinal sections extend substantially from the front end to the rear end.

19. A motorcycle, comprising:

a frame having a front end and a rear end, the frame extending longitudinally from the front end to the rear end;

a front wheel secured to the front end of the frame, the front wheel being rotatable about a first axis;

a rear wheel secured to the rear end of the frame, the rear wheel being rotatable about a second axis, the first and second axes defining a first plane, the first plane being perpendicular to a second plane;

an engine supported by the frame, the engine being located substantially between the front and rear ends of the frame, the engine including at least one air intake port and at least one exhaust port;

a plenum being supported relative to the frame adjacent to the rear end, the plenum being operative to receive ambient air for consumption by the engine;

a turbocharger being supported relative to the frame adjacent to the front end, the turbocharger having an intake chamber and an exhaust chamber, the intake chamber comprising an intake input port and an intake output port, and the exhaust chamber comprising an exhaust input port and an exhaust output port;

at least one muffler being supported relative to the frame adjacent to the rear end;

a first pipe having a first longitudinal section, the first pipe being coupled with both the plenum and with the intake input port of the turbocharger;

a second pipe having a second longitudinal section, the second pipe being coupled with both the exhaust output port of the turbocharger and with said muffler, the first and second longitudinal sections having substantially identical cross sectional configurations, the first and second longitudinal sections being located on opposite sides of the second plane such that the first and second longitudinal sections are, at corresponding longitudinal locations, substantially equally spaced from the second plane, the first and second longitudinal sections being located such that the first and second longitudinal sections are, at corresponding longitudinal locations, substantially equally spaced with respect to the first plane;

a third pipe being coupled with both the intake output port of the turbocharger and with the air intake port of the engine; and a fourth pipe being coupled with both the exhaust input port of the turbocharger and with the exhaust port of the engine.

20. The motorcycle of claim 19 wherein the third pipe has a third longitudinal section, the fourth pipe has a fourth longitudinal section, the third and fourth longitudinal sections having substantially identical cross sectional configurations, the third and fourth longitudinal sections being located on opposite sides of the second plane such that the third and fourth longitudinal sections are, at corresponding longitudinal locations, substantially equally spaced from the second plane, the third and fourth longitudinal sections being located such that the third and fourth longitudinal sections are, at corresponding longitudinal locations, substantially equally spaced with respect to the first plane.

21. A motorcycle, comprising:

a frame having a front end and a rear end, the frame extending longitudinally from the front end to the rear end;

a front wheel secured to the front end of the frame, the front wheel being rotatable about a first axis;

a rear wheel secured to the rear end of the frame, the rear wheel being rotatable about a second axis, the first and second axes defining a first plane, the first plane being perpendicular to a second plane;

an engine supported by the frame, the engine being located substantially between the front and rear ends of the frame, the engine including at least one air intake port and at least one exhaust port;

a plenum being supported relative to the frame adjacent to the front end, the plenum being operative to receive ambient air for consumption by the engine;

at least one muffler being supported relative to the frame adjacent to the rear end;

a first pipe having a first longitudinal section, the first pipe being coupled with both the plenum and with the air intake port of the engine; and a second pipe having a second longitudinal section, the second pipe being coupled with both the exhaust port of the engine and with said muffler, the first and second longitudinal sections having substantially identical cross sectional configurations, the first and second longitudinal sections being located on opposite sides of the second plane such that the first and second longitudinal sections are, at corresponding longitudinal locations, substantially equally spaced from the second plane, the first and second longitudinal sections being located such that the first and second longitudinal sections are, at corresponding longitudinal locations, substantially equally spaced with respect to the first plane.

* * * * *